United States Patent [19]

Ackerman

[11] 3,853,965

[45] Dec. 10, 1974

[54] ANILIC ACIDS OF 3-SUBSTITUTED 2,4,6-TRIIODOANILINES

[75] Inventor: James H. Ackerman, Bethlehem, N.Y.

[73] Assignee: Sterling Drug Inc., New York, N.Y.

[22] Filed: Aug. 13, 1973

[21] Appl. No.: 387,688

Related U.S. Application Data

[60] Division of Ser. No. 181,249, Sept. 16, 1971, Pat. No. 3,803,221, which is a division of Ser. No. 841,604, July 14, 1969, Pat. No. 3,660,408, which is a continuation-in-part of Ser. No. 715,583, March 25, 1968, abandoned.

[52] U.S. Cl............. 260/516, 260/470, 260/471 A, 260/518 A, 260/519, 424/5
[51] Int. Cl........................................... C07c 149/40
[58] Field of Search ... 260/470, 471 A, 516, 518 A, 260/519

[56] References Cited

UNITED STATES PATENTS 3,359,278   12/1967   Wallingford.................... 260/518 A Primary Examiner—Lorraine A. Weinberger
Assistant Examiner—L. A. Thaxton
Attorney, Agent, or Firm—Elmer J. Lawson; Thomas L. Johnson

[57] ABSTRACT

Cyclic imides and anilic acids of 2,4,6-triiodoanilines bearing a substituted amino group in the 3-position are prepared by decarboxylation of the corresponding compounds bearing a carboxyl group in the 5-position. The products are useful as intermediates and as cholecystographic agents.

6 Claims, No Drawings

ANILIC ACIDS OF 3-SUBSTITUTED 2,4,6-TRIIODOANILINES

This application is a division of my prior copending application, Ser. No. 181,249, filed Sept. 16, 1971, now U.S. Pat. No. 3,803,221, which in turn is a division of my prior copending application, Ser. No. 841,604, filed July 14, 1969, now U.S. Pat. No. 3,660,408, which in turn is a continuation-in-part of my prior application, Ser. No. 715,583, filed Mar. 25, 1968, now abandoned.

This invention relates to iodinated aniline derivatives, and more particularly is related to cyclic imides and anilic acids of 2,4,6-triiodoanilines bearing a substituted amino group in the 3-position, and with intermediates and methods for the preparation of these compounds.

A preferred aspect of the invention resides in compounds of the formulas:

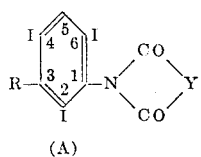
(A)

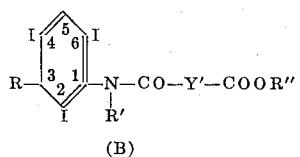
(B)

wherein Y is a lower-alkylene group wherein two or three carbon atoms separate the carbonyl groups, vinylene or a 1,3-propylene group wherein the 2-carbon atom is replaced by O, S, SO, or $SO_2$; Y' is a single bond, vinylene or an alkylene bridge having from one to eight carbon atoms or such a group interrupted by from one to three identical members selected from O, S, SO and $SO_2$, said members, when more than one, being separated by at least two carbon atoms; R is (lower-alkanoyl)NH, (lower-alkanoyl)$NHCH_2$, (lower-alkanoyl)N(lower-alkyl), (lower-alkoxy-lower-alkanoyl)NH, (lower-alkoxy-lower-alkanoyl)N(lower-alkyl),

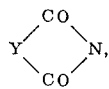

HOOC—Y'—CO—NH, or HOOC—Y'—CO—N(lower-alkyl); R' is hydrogen, lower-alkyl, or hydroxy-lower-alkyl; and R'' is hydrogen or lower-alkyl.

In the above formula A, Y stands for a lower-alkylene group wherein two or three carbon atoms separate the carbonyl groups and thus can be an ethylene or propylene group optionally substituted by lower-alkyl, The group Y can have from two to six carbon atoms and includes such groups as $-CH_2CH_2-$, $-CH_2CH_2CH_2-$, $-CH(CH_3)CH_2-$, $-CH_2CH(CH_3)CH_2-$, $-CH(CH_3)CH(CH_3)-$, $-CH_2CH(C_2H_5)CH_2-$, $-CH(CH_3)CH_2CH_2-$, $-CH(CH_3)CH(CH_3)CH(CH_3)-$, $-CH_2C(CH_3)_2CH_2-$, and the like. Y also stands for a 2-oxa- or 2-thia-1,3-propylene group having from two to four carbon atoms, for example, $-CH_2OCH_2-$, $-CH_2SCH_2-$, $-CH_2SOCH_2-$, $-CH_2SO_2CH_2-$, $-CH(CH_3)OCH_2-$, $-CH(CH_3)OCH(CH_3)-$, and the like. The group Y' in formula B is not limited to a two or three carbon bridge but represents a single bond or a divalent bridge, as hereinabove defined, having from one to eight carbons separating the carbonyl and carboxyl groups, optionally interrupted by from one to three identical members selected from O, S, SO and $SO_2$. The term "interrupted" means, of course, interposed between carbon atoms and not in a terminal position adjacent to the carbonyl groups.

When R in the above formulas A and B stands for (lower-alkanoyl)NH, (lower-alkanoyl)$NHCH_2$, (lower-alkanoyl)-N(lower-alkyl), (lower-alkoxy-lower-alkanoyl)NH or (lower-alkoxy-lower-alkanoyl)N(lower-alkyl), the lower-alkanoyl group has from one to six carbon atoms thus including, for example, formyl, acetyl, propionyl, butyryl, isobutyryl, valeryl, caproyl, and the like.

When R stands for (lower-alkanoyl)N(lower-alkyl), (lower-alkoxy-lower-alkanoyl)N(lower-alkyl), or HOOC—Y'—CO—N(lower-alkyl), and/or R' stands for lower-alkyl, and/or R'' stands for lower-alkyl, the lower-alkyl group has from one to four carbon atoms, thus including, for example, methyl, ethyl, propyl, isopropyl, and butyl.

When R stands for (lower-alkoxy-lower-alkanoyl)NH or (lower-alkoxy-lower-alkanoyl)N(lower-alkyl), the lower-alkoxy groups have from one to four carbon atoms and thus include, for example, methoxy, ethoxy, propoxy, isopropoxy, butoxy, and the like.

The compounds of the invention of formulas A and B above are prepared by decarboxylation of compounds of formulas C and D, respectively, as follows:

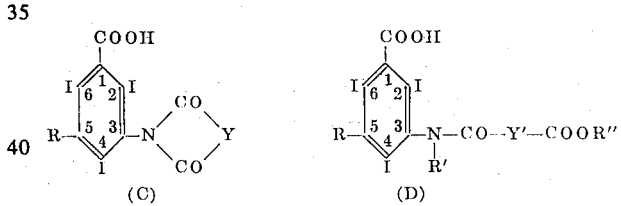
(C)    (D)

wherein Y, Y', R, R' and R'' have the same meanings given hereinabove. The decarboxylation is carried out by heating a compound of formula C or D, either in the free acid or salt form, in an organic solvent. A preferred method is heating the free acid or salt form, for example, the sodium salt, in dimethylformamide at a temperature between about 85° and 140°C.

The intermediate carboxylic acids of formulas C and D are the subject of my copending application, Ser. No. 808,653, filed Mar. 19, 1969 now U.S. Pat. No. 3,609,147, a continuation-in-part of abandoned applications Ser. Nos. 550,614 and 715,558, filed May 17, 1966 and Mar. 25, 1968, respectively, and are prepared as described below.

The method of preparation of the compounds of formulas C and D varies according to the structure desired as follows:

1. Compounds of formula C where R is (lower-alkanoyl)$NHCH_2$, (lower-alkanoyl)N(lower-alkyl), (lower-alkoxy-lower-alkanoyl)-N(lower-alkyl),

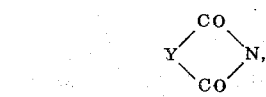

or HOOC—Y—CO—N(lower-alkyl).

a. Using a Dibasic Acid Anhydride

A compound of the formula

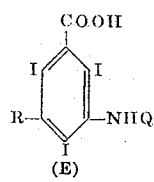

wherein R has the meaning given above under 1), and Q is hydrogen or lower-alkanoyl, is heated with an acid anhydride of the formula

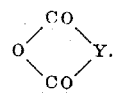

When Y is a lower-alkylene group, the reaction is preferably carried out in the presence of a strong acid catalyst, for example, sulfuric acid or phosphoric acid. When the reaction is carried out with a compound of formula E where Q is lower-alkanoyl, the lower-alkanoyl group is lost and replaced by the cyclic imide group.

b. Using a Succinyl or Glutaryl Chloride:

A compound of formula E where Q is hydrogen is heated with a compound of the formula Cl—OC—Y—CO—Cl, where Y is a lower-alkylene group wherein two or three carbon atoms separate the carbonyl groups, in an inert solvent.

2. Compounds of formula D where R' is hydrogen a. Where Y' is Within the Scope of Y, and R'' is Hydrogen These compounds can be prepared by alkaline hydrolysis of the corresponding compounds of formula C. The reaction takes place in aqueous solution under mild conditions, at room temperature. Under these conditions the amide linkage to the 3-amino group is unaffected.

b. Where R is as Given Under Method 1) Above

These compounds can be prepared by reacting a compound of formula E where Q is hydrogoen with a half ester half acid chloride, Cl—CO—Y'—CO—OR'', in an inert solvent, affording a compound of formula D where R'' is lower-alkyl. Hydrolysis of the latter under mild alkaline conditions gives an anilic acid of formula D where R'' is hydrogen.

3. Compounds of formulas C and D wherein R is (lower-alkanoyl)NH or (lower-alkoxy-lower-alkanoyl)NH These compounds can be prepared from 3-amino-5-nitrobenzoic acid according to the following flow sheet:

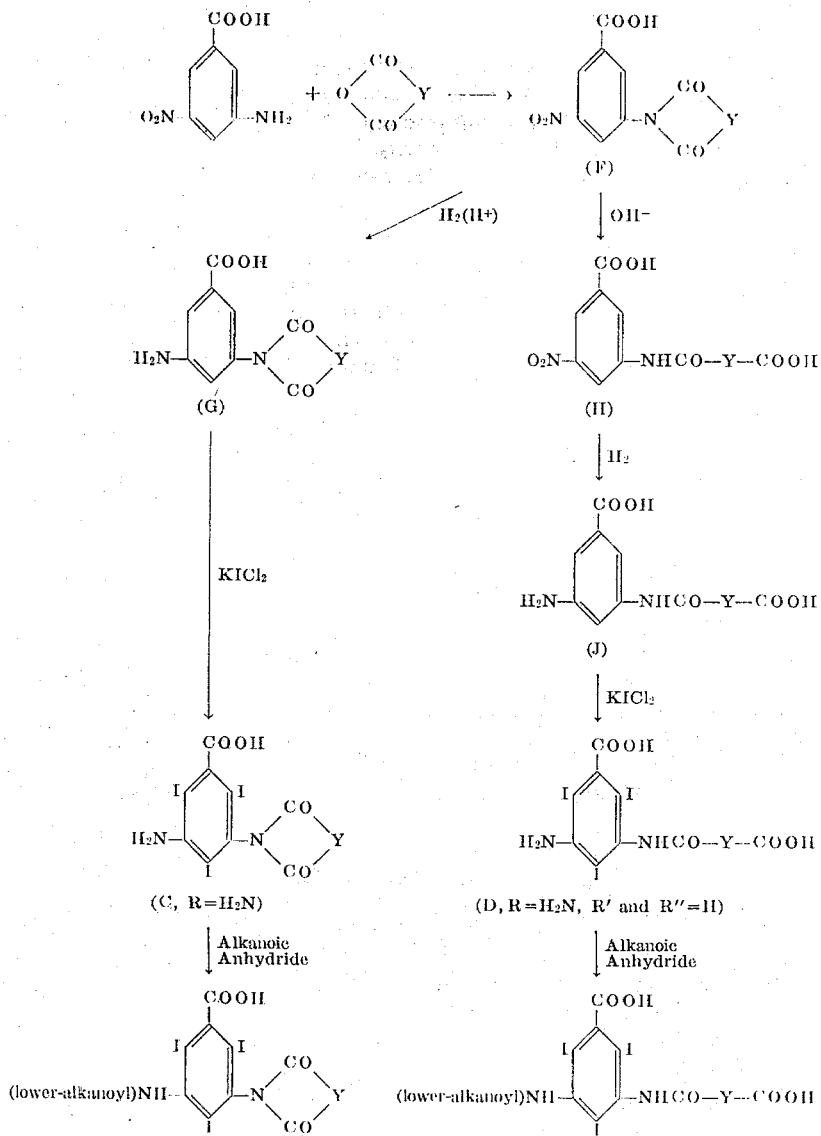

3-Amino-5-nitrobenzoic acid is reacted with an anhydride, $O(CO)_2Y$, to give the cyclic imide (F). The latter can either be hydrogenated under acid or neutral conditions to give the amino cyclic imide (G) or hydrolyzed under basic conditions to give the corresponding nitro-anilic acid (H). The nitro-anilic acid in turn can be hydrogenated to the amino-anilic acid (J). Iodination of the amino cyclic imide (G) affords a compound of formula C where R is $H_2N$, and iodination of the amino-anilic acid (J) gives a compound of formula D where R is $H_2H$ and R' is H. The primary amino groups can then, if desired, be acylated with a lower-alkanoic acid anhydride or lower-alkoxy-lower-alkanoic acid anhydride to give, respectively, a compound of formula C where R is (lower-alkanoyl)NH or (lower-alkoxy-lower-alkanoyl)NH, or a compound of formula D where R is (lower-alkanoyl)NH or (lower-alkoxy-lower-alkanoyl)NH and R' is hydrogen.

4. Compounds of formulas C and D where the groups in the 3- and 5-positions are identical These are most conveniently prepared from 3,5-diamino-2,4,6-triiodobenzoic acid. The latter is reacted with at least two equivalents of an anhydride, $O(CO)_2Y$, to afford a compound of formula C where R is $Y(CO)_2N$, which then can be hydrolyzed to a compound of formula D where R is HOOC—Y—CONH and R' and R'' are H. The starting material can also consist of a 3-lower-alkanoylamino-5-amino-2,4,6-triiodobenzoic acid or a 3,5-bis(lower-alkanoylamino)benzoic acid. In the reaction with the anhydride the lower-alkanoyl groups are replaced by cyclic imide groups. Alternatively, a method analogous to method 2(b) above can be used, i.e., reacting 3,5-diamino-2,4,6-triiodobenzoic acid with a half ester half acid chloride Cl—CO—Y'—CO—OR'', affording a compound of formula B where R is R''OCO-Y'-CONH, R' is H and R'' is lower-alkyl.

5. Compounds of formula D wherein R' is lower-alkyl or hydroxy-lower-alkyl

These compounds can be prepared by N-alkylation of the corresponding compounds where R' is hydrogen. The alkylation is effected by the action of a lower-alkyl or hydroxy-lower-alkyl halide, sulfate, alkylsulfonate or arylsulfonate in the presence of aqueous alkali. If the starting material is a compound of formula D where R is (lower-alkanoyl)NH or HOOC—Y'—CO—NH, alkylation occurs on both nitrogens simultaneously.

The compounds of the invention where Y and/or Y' are alkylene groups interrupted by SO or $SO_2$ can alternatively be prepared by oxidation of the corresponding sulfide (—S—) compounds with a peracid or hydrogen peroxide. The reaction takes place at room temperature in an inert organic solvent.

Alternatively, the compounds of formulas A and B can be prepared from compounds of the formula:

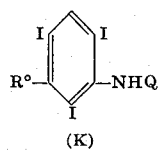

(K)

wherein R° is $H_2N$, (lower-alkanoyl)NH, (lower-alkanoyl)NHCH$_2$, (lower-alkanoyl)N(lower-alkyl), (lower-alkoxy-lower-alkanoyl)-N(lower-alkyl),

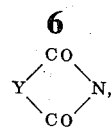

or HOOC-Y-CO-N(lower-alkyl), where Y has the meaning given hereinabove, and Q is hydrogen or lower-alkanoyl, by formation of the cyclic imides and anilic acids by methods analogous to those described above for the preparation of compounds of formulas C and D. The compounds of formula K are in turn prepared by decarboxylation of the compounds of formula E or by other procedures known in the art as illustrated by the specific examples hereinbelow.

The structures of the compounds of the invention were determined by the modes of synthesis, by elementary analysis and by neutral equivalent determinations. The course of the reactions was followed by thin-layer chromatography.

Those compounds of the invention which are carboxylic acids can be obtained in the form of salts derived from inorganic bases or organic amines. Preferred salts are those which are pharmaceutically acceptable, for example, the sodium, magnesium, calcium and N-methylglucamine salts; although all salts are useful either as characterizing derivatives or as intermediates in the purification of the acids.

The compounds of the invention having the formula A wherein R is HOOC—Y'—CO—NH or HOOC—Y'—CO—N(lower-alkyl), and the compounds of the invention having the formula B are useful as X-ray contrast media for visualization of the gall-bladder (cholecystography). The compounds have intravenous toxicity (approximate $LD_{50}$ values) in the range between 600 and 7,500 mg./kg. in mice. The compounds of lesser toxicity, $LD_{50} = 1,500$ mg./kg. or greater, are primarily useful, in the form of their water-soluble, pharmaceutically acceptable salts, as intravenous cholecystographic agents. The compounds having $LD_{50}$ values less than about 1,500 mg./kg. are primarily useful, either in the free acid or salt form, as oral cholecystographic agents.

The actual quantitative determination of toxicity and radiopaque effectiveness for a particular compound is readily determined by standard test procedures by technicians trained in pharmacological test procedures, without the need for any extensive experimentation.

The compounds were tested for their intravenous cholecystographic efficacy by standard procedure as follows: The test compound was injected intravenously in the form of an aqueous solution of the sodium or N-methylglucamine salt to cats. Each cat was X-rayed at selected time intervals and the roentgenograms examined and evaluated. The density of the gallbladder shadows was interpreted in accordance with a numerical scoring plan designated as the Cholecystographic Index (CI), a measure of the efficiency of the test compound, viz.: 0 (none), 1 (poor), 2 (fair), 3 (good), 4 (excellent) [see J. O. Hoppe, J. Am. Pharm. Assoc., Sci. Ed. 48, 368–79 (1959)].

In testing for oral cholecystography, the test compound was administered orally in capsules to each of five cats. About 18 hours later, each cat was X-rayed and the roentgenograms were examined. The density of the gallbladder shadow evoked by the test compound in each cat was interpreted in accordance with the above numerical scoring plan and the Average Cholecystographic Index (ACI) determined.

The compounds of the invention, upon testing for cholecystographic effectiveness in cats at a dose of 100 mg./kg., were found to produce gallbladder shadows having a Cholecystographic Index of 3.0–4.0 either by oral or by intravenous administration.

The compounds of the invention are prepared for cholecystographic use by dissolving a pharmaceutically acceptable salt form in sterile aqueous medium suitable for intravenous injection; or in capsule or in tablet form with conventional excipients for oral administration.

The compounds of formula A, wherein R is (lower-alkanoyl)NH, (lower-alkanoyl)NHCH$_2$, (lower-alkanoyl)N(lower-alkyl), (lower-alkoxy-lower-alkanoyl)NH, (lower-alkoxy-lower-alkanoyl)N(lower-alkyl) or

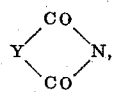

are useful as intermediates, by hydrolytic cleavage, for the preparation of compounds of formula B.

The following examples will further illustrate the invention.

EXAMPLE 1 a. 3,5-bis(Glutarimido)-2,4,6-triiodobenzoic Acid [C; R is (CH$_2$)$_3$(CO)$_2$N, Y is CH$_2$CH$_2$CH$_2$] was prepared from 265 g. of 3,5-diamino-2,4,6-triiodobenzoic acid, 400 g. of glutaric anhydride and 18 ml. of concentrated sulfuric acid, heated and stirred for seventeen hours. The product was recrystallized from dimethyl sulfoxide, adding water to induce precipitation, and was obtained as a light gray solid with one mole of dimethyl sulfoxide of crystallization, m.p. above 300°C. A sample of the acid was converted to its sodium salt form, m.p. 288°–291°C. (dec.) when recrystallized from water.

b. N,N'-(2,4,6-Triiodo-m-phenylene)diglutarimide [A; R is (CH$_2$)$_3$(CO)$_2$N, Y is CH$_2$CH$_2$CH$_2$].

A mixture of 89.10 g. of sodium 3,5-bis(glutarimido)-2,4,6-triiodobenzoate and 400 ml. of dimethylformamide was warmed at 85°C. for 20 minutes to effect solution, and then heated at reflux temperature (130°–135°C.) for 4 hours. The solution was cooled, and the solid product collected, washed with dimethylformamide and acetone, and dried to constant weight (35.18 g.). An additional 41.75 g. of product was obtained by diluting the filtrate with water. The combined product was recrystallized from acetic acid, using activated charcoal for decolorizing purposes, to give N,N'-(2,4,6-triiodo-m-phenylene)diglutarimide, colorless prisms, m.p. above 300°C.

N,N'-(2,4,6-Triiodo-m-phenylene)diglutarimide can also be prepared by reacting 3-amino-2,4,6-triiodoaniline (K; R° is H$_2$N, Q is H), 3-amino-2,4,6-triiodoacetanilide (K; R° is H$_2$N, Q is COCH$_3$), or 3-acetamido-2,4,6-triiodoacetanilide (K; R° is CH$_3$CONH, Q is COCH$_3$) with glutaric anhydride according to the procedure of Example 1, part (a).

EXAMPLE 2 a. 3-Glutarimido-5-(N-methylacetamido)-2,4,6-triiodobenzoic Acid [C; R is CH$_3$CON(CH$_3$), Y is CH$_2$CH$_2$CH$_2$].

A mixture of 117.2 g. of 3-amino-5-(N-methylacetamido)-2,4,6-triiodobenzoic acid and 182 g. of glutaric anhydride was heated with stirring on a steam bath. Concentrated sulfuric acid (10 ml.) was added, and heating and stirring were continued for seven hours. The reaction mixture was added to 700 ml. of water, and the solid product was collected by filtration and recrystallized from acetic acid. The resulting 3-glutarimido-5-(N-methylacetamido)-2,4,6-triiodobenzoic acid was converted to its sodium salt form as follows: the free acid was slurried with 40 ml. of methanol and 1N solution of sodium hydroxide in methanol was added with trituration until the solid had dissolved. The sodium salt was precipitated out with ether, and the resulting gum was triturated with ether and dissolved in methanol. The latter solution was decolorized with activated charcoal and the product reprecipitated with ether. The product was dissolved in water and the solution filtered and concentrated in vacuo. The residue was dried in vacuo to give the sodium salt of 3-glutarimido-5-(N-methylacetamido)-2,4,6-2,4,6-triiodobenzoic acid as a pale pink solid, m.p. 200°–204°C. (dec.).

b. N-[2,4,6-Triiodo-3-(N-methylacetamido)phenyl]glutarimide [A; R is CH$_3$CON(CH$_3$), Y is CH$_2$CH$_2$CH$_2$] can be prepared by decarboxylation of sodium 3-glutarimido-5-(N-methylacetamido)-2,4,6-triiodobenzoate according to the procedure of Example 1(b); or by decarboxylation of 3-acetamido-5-(N-methylacetamido)-2,4,6-triiodobenzoic acid followed by reacting the resulting 3-(N-methylacetamido)-2,4,6-triiodoacetanilide [K; R° is CH$_3$CON(CH$_3$), Q is COCH$_3$] with glutaric anhydride.

By replacing the 3-amino-5-(N-methylacetamido)-2,4,6-triiodobenzoic acid in the foregoing preparation by a molar equivalent amount of 3-amino-5-(N-butylacetamido)-2,4,6-triiodobenzoic acid, 3-amino-5-(N-methylpropionamido)-2,4,6-triiodobenzoic acid, 3-amino-5-(N-methylcaproylamino)-2,4,6-triiodobenzoic acid, 3-amino-5-(N,N-dimethylcarbamoyl)-2,4,6-triiodobenzoic acid, or 3-amino-5-(N-methyl-2-methoxyacetamido)-2,4,6-triiodobenzoic acid, there can be obtained, respectively, 3-glutarimido-5-(N-butylacetamido)-2,4,6-triiodobenzoic acid [C; R is CH$_3$CON(C$_4$H$_9$), Y is CH$_2$CH$_2$CH$_2$], 3-glutarimido-5-(N-methylpropionamido)-2,4,6-triiodobenzoic acid [C; R is CH$_3$CH$_2$CON(CH$_3$), Y is CH$_2$CH$_2$CH$_2$], 3-glutarimido-5-(N-methylcaproylamino)-2,4,6-triiodobenzoic acid [C; R is CH$_3$(CH$_2$)$_4$CON(CH$_3$), Y is CH$_2$CH$_2$CH$_2$], 3-glutarimido-5-(N,N-dimethylcarbamoyl)-2,4,6-triiodobenzoic acid [C; R is (CH$_3$)$_2$NCO, Y is CH$_2$CH$_2$CH$_2$], or 3-glutarimido-5-(N-methyl-2-methoxyacetamido)-2,4,6-triiodobenzoic acid [C; R is CH$_3$OCH$_2$CON(CH$_3$), Y is CH$_2$CH$_2$CH$_2$]; which in turn can be decarboxylated to give, respectively, N-[2,4,6-triiodo-3-(N-butylacetamido)phenyl]glutarimide [A; R is CH$_3$CON(C$_4$H$_9$), Y is CH$_2$CH$_2$CH$_2$], N-[2,4,6-triiodo-3-(N-methylpropionamido)-phenyl]glutarimide [A; R is CH$_3$CH$_2$CON(CH$_3$), Y is CH$_2$CH$_2$CH$_2$], N-[2,4,6-triiodo-3-(N-methylcaproylamino)phenyl]glutarimide [A; R is CH$_3$(CH$_2$)$_4$CON(CH$_3$), Y is CH$_2$CH$_2$CH$_2$], N-[2,4,6-triiodo-3-(N,N-dimethylcarbamoyl)phenyl]-glutarimide [A; R is (CH$_3$)$_2$NCO, Y is CH$_2$CH$_2$CH$_2$], or N-[2,4,6-triiodo-3-(N-methylmethoxyacetamido)- phenyl]glutarimide [A; R is $CH_3OCH_2CON(CH_3)$, Y is $CH_2CH_2CH_2$].

EXAMPLE 3 a. 3-Succinimido-5-(N-methylacetamido)-2,4,6-triiodobenzoic Acid [C; R is $CH_3CON(CH_3)$, Y is $CH_2CH_2$] was prepared from 87.9 g. of 3-amino-5-(N-methylacetamido)-2,4,6-triiodobenzoic acid, 120 g. of succinic anhydride and 6 ml. of sulfuric acid according to the procedure of Example 2, except that a reaction temperature of 130°–140°C. was used. The reaction was essentially complete after 30 minutes heating time. The compound was isolated in the form of its sodium salt, pale yellow solid, m.p. 220°–222°C. (dec.).

b. N-[2,4,6-Triiodo-3-(N-methylacetamido)phenyl]-succinimide [A; R is $CH_3CON(CH_3)$, Y is $CH_2CH_2$] can be prepared by heating sodium 3-succinimido-5-(N-methylacetamido)-2,4,6-triiodobenzoate in dimethylformamide by the method described in Example 1(b).

EXAMPLE 4 a. 3-(3-Methylglutarimido)-5-(N-methylacetamido)-2,4,6-triiodobenzoic Acid [C; R is $CH_3CON(CH_3)$, Y is $CH_2CH(CH_3)CH_2$] was prepared from 3-amino-5-(N-methylacetamido)-2,4,6-triiodobenzoic acid, 3-methylglutaric anhydride and sulfuric acid according to the procedure of Example 2. The product was isolated in the free acid form, m.p. 301°–302°C. (dec.) when recrystallized from acetic acid.

b. N-[2,4,6-Triiodo-3-(N-methylacetamido)phenyl]-3-methylglutarimide [A; R is $CH_3CON(CH_3)$, Y is $CH_2CH(CH_3)CH_2$] can be prepared by heating sodium 3-succinimido-5-(N-methylacetamido)-2,4,6-triiodobenzoate in dimethylformamide by the method described in Example 1(b).

The following compounds were prepared following the procedure of Example 1 from the appropriate 3-amino-5-R-2,4,6-triiodobenzoic acid and acid anhydride:

EXAMPLE 5

3-(3,3-Dimethylglutarimido)-5-(N-methylacetamido)-2,4,6-triiodobenzoic Acid [C; R is $CH_3CON(CH_3)$, Y is $CH_2C(CH_3)_2CH_2$], pale tan solid, m.p. 274°–278°C. (dec.) (from acetic acid); sodium salt form, pale yellow solid, m.p. 235°–245°C. (dec.).

EXAMPLE 6

3-Glutarimido-5-(N-ethylacetamido)-2,4,6-triiodobenzoic Acid [C; R is $CH_3CON(C_2H_5)$, Y is $CH_2CH_2CH_2$], sodium salt form, m.p. above 220°C.

EXAMPLE 7

3-(Methylsuccinimido)-5-(N-methylacetamido)-2,4,6-triiodobenzoic Acid [C; R is $CH_2CON(CH_3)$, Y is $CH(CH_3)CH_2CH_2$], m.p. 285°–287°C. (from acetic acid); sodium salt form, m.p. above 245°C. (dec.).

EXAMPLE 8

3-(Diglycolimido)-5-(N-methylacetamido)-2,4,6-triiodobenzoic Acid [C; R is $CH_3CON(CH_3)$, Y is $CH_2OCH_2$], sodium salt form, m.p. 250°–255°C. No sulfuric acid was used in this preparation.

EXAMPLE 9

3-(3,5-Dioxothiomorpholino)-5-(N-methylacetamido)-2,4,6-triiodobenzoic Acid [C; R is $CH_3CON(CH_3)$, Y is $CH_2SCH_2$], sodium salt form, beige solid, m.p. 250°–260°C. (dec.). No sulfuric acid was used in this preparation.

The compounds of Examples 5, 6 and 7 can be decarboxylated by the method of Example 1(b) to produce, respectively, N-[2,4,6-triiodo-3-(N-methylacetamido)phenyl]-3,3-dimethylglutarimide [A; R is $CH_3CON(CH_3)$, Y is $CH_2C(CH_3)_2CH_2$], N-[2,4,6-triiodo-3-(N-ethylacetamido)phenyl]glutarimide [A; R is $CH_3CON(C_2H_5)$, Y is $CH_2CH_2CH_2$], and N-[2,4,6-triiodo-3-(N-methylacetamido)phenyl]methylsuccinimide [A; R is $CH_3CON(CH_3)$, Y is $CH(CH_3)CH_2CH_2$].

The compounds of Examples 8 and 9 were decarboxylated by heating the free acid forms in dimethylformamide, 90 minutes at reflux temperature. There was obtained, respectively, N-[2,4,6-triiodo-3-(N-methylacetamido)phenyl]diglycolimide [A; R is $CH_3CON(CH_3)$, Y is $CH_2OCH_2$], m.p. 264°–266°C. (from dimethylformamide); and 4-[2,4,6-triiodo-3-(N-methylacetamido)-phenyl]-3,5-thiamorpholinedione [A; R is $CH_3CON(CH_3)$, Y is $CH_2SCH_2$], beige solid, m.p. 283°–285°C. (from acetic acid). The latter two compounds were also prepared by heating together at 120°–150°C. equal weights of 2,4,6-triiodo-3-(N-methylacetamido)-aniline and diglycolic anhydride or thiodiacetic anhydride, respectively.

3-(3,5-Dioxothiomorpholino)-5-(N-methylacetamido)-2,4,6-triiodobenzoic acid can be oxidized with m-chloroperbenzoic acid in dimethylformamide solution to give 3-(3,5,S,S-tetraoxothiomorpholino)-5-(N-methylacetamido)-2,4,6-triiodobenzoic acid [C; R is $CH_3CON(CH_3)$, Y is $CH_2SO_2CH_2$], which can be decarboxylated according to the procedure of Example 1(b) to give 4-[2,4,6-triiodo-3-(N-methylacetamido)phenyl]-3,5,S,S-tetraoxothiomorpholine [A; R is $CH_3CON(CH_3)$, Y is $CH_2SO_2CH_2$].

EXAMPLE 10 a. 3'-Carboxy-5'-(N-methylacetamido)-2',4',6'-triiodoglutaranilic Acid [D; R is $CH_3CON(CH_3)$, R' and R'' are H, Y' is $CH_2CH_2CH_2$].

A mixture of 58.6 g. of 3-amino-5-(N-methylacetamido)-2,4,6-triiodobenzoic acid, 74 g. of glutaric anhydride and 8 ml. of concentrated sulfuric acid was heated on a steam bath for five hours. The reaction mixture was poured into water and the solid product collected by filtration. The product, consisting of 3-glutarimido-5-(N-methylacetamido)-2,4,6-triiodobenzoic acid (Example 2) was dissolved in excess dilute aqueous sodium hydroxide, and the solution warmed for thirty minutes, then cooled and 3N hydrochloric acid added slowly until precipitation was complete. The solid product was collected and recrystallized first from acetone, then from acetic acid, and finally from water to give 3'-carboxy-5'-(N-methylacetamido)-2',4',6'-triiodoglutaranilic acid, colorless prisms, m.p. 188.8°–196.0°C.

b. 2',4',6'-Triiodo-3'-(N-methylacetamido)glutaranilic Acid [B; R is $CH_3CON(CH_3)$, R' and R'' are H, Y' is $CH_2CH_2CH_2$] can be prepared by heating the disodium salt form of 3'-carboxy-5'-(N-methylacetamido)-2',4',6'-triiodoglutaranilic acid in dimethylformamide according to the procedure of Example 1(b).

EXAMPLE 11 a. 3'-Carboxy-5'-(N-methylacetamido)-2',4',6'-triiodosuccinanilic Acid [D; R is $CH_3CON(CH_3)$, R' and R'' are H, Y' is $CH_2CH_2$] was prepared from 34.3 g. of 3-amino-5-(N-methylacetamido)-2,4,6-triiodobenzoic acid, 82 g. of succinic anhydride and 5 ml. of concentrated sulfuric acid, followed by alkaline hydrolysis of the resulting 3-succinimido-5-(N-methylacetamido)-2,4,6-triiodobenzoic acid, according to the method described in Example 10. The product was recrystallized from dilute ethanol and from a methanol-acetonitrile mixture and further purified by converting it to the diammonium salt by means of ammonium hydroxide in methanol, and then acidifying an aqueous solution of the ammonium salt to regenerate the free acid. There was thus obtained 3'-carboxy-5'-(N-methylacetamido)-2',4',6'-triiodosuccinanilic acid, m.p. 275.0°–276.0°C. (dec.).

b. 2',4',6'-Triiodo-3'-(N-methylacetamido)succinanilic Acid [B; R is $CH_3CON(CH_3)$, R' and R'' are H, Y' is $CH_2CH_2$], colorless prisms, m.p. 209°–211°C., was prepared from 37.81 g. of disodium 3'-carboxy-5'-(N-methylacetamido)-2',4',6'-triiodosuccinanilate in 100 ml. of dimethylformamide, 40 minutes at reflux. The mixture was acidified with hydrochloric acid and the product collected and recrystallized from acetone.

Similarly, by warming in dilute aqueous sodium hydroxide, 3-glutarimido-5-(N-butylacetamido)-2,4,6-triiodobenzoic acid, 3-glutarimido-5-(N-methylpropionamido)-2,4,6-triiodobenzoic acid, 3-glutarimido-5-(N-methylcaproylamino)-2,4,6-triiodobenzoic acid, or 3-glutarimido-5-(N-methyl-2-methoxyacetamido)-2,4,6-triiodobenzoic acid can be hydrolyzed, respectively, to 3'-carboxy-5'-(N-butylacetamido)-2',4',6'-triiodoglutaranilic acid [D; R is $CH_3CON(C_4H_9)$, R' and R'' are H, Y' is $CH_2CH_2CH_2$], 3'-carboxy-5'-(N-methylpropionamido)-2',4',6'-triiodoglutaranilic acid [D; R is $CH_3CH_2CON(CH_3)$, R' and R'' are H, Y' is $CH_2CH_2CH_2$], 3'-carboxy-5'-(N-methylcaproylamino)-2',4',6'-triiodoglutaranilic acid [D; R is $CH_3(CH_2)_4CON(CH_3)$, R' and R'' are H, Y' is $CH_2CH_2CH_2$], or 3'-carboxy-5'-(N-methyl-2-methoxyacetamido)-2',4',6'-triiodoglutaranilic acid [D; R is $CH_3OCH_2CON(CH_3)$, R' and R'' are H, Y' is $CH_2CH_2CH_2$]; and in turn decarboxylated to give, respectively, 3'-(N-butylacetamido)-2',4',6'-triiodoglutaranilic acid [B; R is $CH_3CON(C_4H_9)$, R' and R'' are H, Y' is $CH_2CH_2CH_2$], 3'-(N-methylpropionamido)-2',4',6'-triiodoglutaranilic acid [B; R is $CH_3CH_2CON(CH_3)$, R' and R'' are H, Y' is $CH_2CH_2CH_2$], 3'-(N-methylcaproylamino)-2',4',6'-triiodoglutaranilic acid [B; R is $CH_3(CH_2)_4CON(CH_3)$, R' and R'' are H, Y' is $CH_2CH_2CH_2$], or 3'-(N-methyl-2-methoxyacetamido)-2',4',6'-triiodoglutaranilic acid [B; R is $CH_3OCH_2CON(CH_3)$, R' and R'' are H, Y' is $CH_2CH_2CH_2$].

3'-Carboxy-5'-(N-methylacetamido)-2',4',6'-triiodoglutaranilic acid can also be prepared by heating 3-amino-5-(N-methylacetamido)-2,4,6-triiodobenzoic acid with 4-carbomethoxybutyryl chloride ($CH_3OCOCH_2CH_2CH_2COCl$) in dioxane solution, followed by hydrolysis of the resulting methyl 3'-carboxy-5'-(N-methylacetamido)-2',4',6'-triiodoglutaranilate by heating it with potassium carbonate in methanol solution.

Similarly, 3-amino-5-(N-methylacetamido)-2,4,6-triiodobenzoic acid can be caused to react with Cl—$COCH_2CH_2CH_2CH_2COOCH_3$, Cl—$COCH_2CH_2OCH_2COOCH_3$, Cl—$COCH_2CH_2OCH_2CH_2OCH_2CH_2COOCH_3$ or Cl—$COCH_2SCH_2CH_2CH_2SCH_2COOCH_3$ to give, respectively, the following compounds: [D; R is $CH_3CON(CH_3)$, R' is H, R'' is $CH_3$, Y' is $CH_2CH_2CH_2CH_2$]; [D; R is $CH_3CON(CH_3)$, R' is H, R'' is $CH_3$, Y' is $CH_2CH_2OCH_2CH_2$]; [D; R is $CH_3CON(CH_3)$, R' is H, R'' is $CH_3$, Y' is $CH_2CH_2OCH_2CH_2OCH_2CH_2OCH_2CH_2$] or [D; R is $CH_3CON(CH_3)$, R' is H, R'' is $CH_3$, Y' is $CH_2SCH_2CH_2CH_2CH_2SCH_2$]. These can be hydrolyzed to the corresponding dibasic acids where R'' is hydrogen and decarboxylated to give, respectively, the following compounds:

[B; R is $CH_3CON(CH_3)$, R' and R'' are H, Y' is $CH_2CH_2CH_2CH_2$];

[B; R is $CH_3CON(CH_3)$, R' and R'' are H, Y' is $CH_2CH_2OCH_2Ch_2$];

[B; R is $CH_3CON(CH_3)$, R' and R'' are H, Y' is $CH_2CH_2OCH_2CH_2OCH_2CH_2—OCH_2CH_2$] or [B; R is $CH_3CON(CH_3)$, R' and R'' are H, Y' is $CH_2SCH_2CH_2CH_2CH_2SCH_2$].

The starting half-ester half-acid chlorides are a known class of compounds readily prepared by partial hydrolysis of the corresponding di-esters followed by reaction of the resulting half-esters with thionyl chloride.

In the same manner, 3,5-diamino-2,4,6-triiodobenzoic acid can be caused to react with Cl-$COCH_2CH_2CH_2CH_2COOCH_3$ to give [D; R is $CH_3O-COCH_2CH_2CH_2CH_2CONH$, R' is H, R'' is $CH_3$, Y' is $CH_2CH_2CH_2CH_2$], which can be hydrolyzed to give [D; R is $HOCOCH_2CH_2CH_2CH_2CONH$, R' and R'' are H, Y' is $CH_2CH_2CH_2CH_2$], and the latter decarboxylated to give [B; R is $HOCOCH_2CH_2CH_2CH_2CONH$, R' and R'' are H, Y' is $CH_2CH_2CH_2CH_2$].

EXAMPLE 12 a. 3-[2-(Carboxymethylsulfonyl)acetamido]-2,4,6-triiodo-5-(N-methylacetamido)benzoic Acid [D; R is $CH_3CON(CH_3)$, R' and R'' are H, Y' is $CH_2SO_2CH_2$].

A solution of 26.1 g. of 3-amino-5-(N-methylacetamido)-2,4,6-triiodobenzoic acid in 300 ml. of dioxane was distilled until about 60 ml. of dioxane was removed in order to eliminate possible traces of water. Sulfonyldiacetyl chloride ($ClCOCH_2SO_2CH_2COCl$) (5.85 g.) was then added, and the mixture was stirred and refluxed for about five days. The reaction mixture was concentrated in vacuo to remove the solvent, and the residue was dissolved in dilute sodium hydroxide to give a solution of the sodium salt of the product. The basic solution was made weakly acid, which did not cause precipitation of the acid form of the product, treated with activated charcoal at 60°C. and filtered. The filtrate was acidified with 3N hydrochloric acid and the precipitated product collected. The acid product was purified by dissolving it in ammonium hydroxide solution and reacidifying the resulting ammonium salt solution. The acid product was recrystallized from aqueous dimethylformamide to give 3-[2-

(carboxymethylsulfonyl)acetamido]-2,4,6-triiodo-5-(N-methylacetamido)benzoic acid, m.p. above 300°C.

b. {N-[2,4,6-Triiodo-3-(N-methylacetamido)phenyl]carbamoylmethylsulfonyl}acetic Acid [B; R is $CH_3CON(CH_3)$, R' and R'' are H, Y' is $CH_2SO_2CH_2$] can be prepared by decarboxylation of 3-[2-(carboxymethylsulfonyl)acetamido]-2,4,6-triiodo-5-(N-methylacetamido)benzoic acid according to the procedure of Example 1(b). The product is the same as that described in Example 20 below.

By replacing the sulfonyldiacetyl chloride in the foregoing preparation by sulfoxydiacetyl chloride ($ClCOCH_2$-$SO$-$CH_2COCl$) there can be obtained 3-[2-(carboxymethylsulfoxy)acetamido]-2,4,6-triiodo-5-(N-methylacetamido)benzoic acid [D; R is $CH_3CON(CH_3)$, R' and R'' are H, Y' is $CH_2SOCH_2$], which can be decarboxylated to give {N-[2,4,6-triiodo-3-(N-methylacetamido)phenyl]carbamoylmethylsulfoxy}acetic acid [B; R is $CH_3CON(CH_3)$, R' and R'' are H, Y' is $CH_2SOCH_2$].

The following compounds can be prepared either by mild alkaline hydrolysis of the corresponding cyclic imides, or directly from the appropriate 3-amino-5-R-2,4,6-triiodobenzoic acid without isolation of the intermediate cyclic imide, followed by decarboxylation of the resulting anilic acid, as described above in Examples 10 and 11.

EXAMPLE 13 a. 3'-Carboxy-2',4',6'-triiodo-3-methyl-5'-(N-methylacetamido)glutaranilic Acid [D; R is $CH_3CON(CH_3)$, R' and R'' are H, Y' is $CH_2CH(CH_3)CH_2$], colorless crystals, m.p. 256°–259°C.(dec.).

b. 2',4',6'-Triiodo-3-methyl-3'-(N-methylacetamido)-glutaranilic Acid [B; R is $CH_3CON(CH_3)$, R' and R'' are H, Y' is $CH_2CH(CH_3)CH_2$], pale tan crysytals from aqueous acetic acid, m.p. 189°–193°C.; sodium salt form, beige powder from methanol-ether, m.p. 202°–204°c.

EXAMPLE 14 a. 3,5-bis(4-Carboxybutyramido)-2,4,6-triiodobenzoic Acid [D; R is $HOOC(CH_2)_3CONH$, R' and R'' are H, Y' is $CH_2CH_2CH_2$], colorless solid, m.p. 251°–253°C. (from acetic acid).

b. N,N'-(2,4,6-Triiodo-m-phenylene)diglutaramic Acid [B; R is $HOOC(CH_2)_3CONH$, R' and R'' are H, Y' is $CH_2CH_2CH_2$], colorless prisms from acetic acid, m.p. 278°–279°C. [prepared by hydrolysis of N,N'-(2,4,6-triiodo-m-phenylene)diglutarimide (Example 1b) with sodium hydroxide in acetone solution two hours at reflux].

EXAMPLE 15 a. 3'-Carboxy-2',4',6'-triiodo-3,3-dimethyl-5'-(N-methylacetamido)glutaranilic Acid [D; R is $CH_3CON(CH_3)$, R' and R'' are H, Y' is $CH_2C(CH_3)_2CH_2$], colorless crystals, m.p. 258°–262°C.(dec.).

b. 2',4',6'-Triiodo-3,3-dimethyl-3'-(N-methylacetamido)glutaranilic Acid [B; R is $CH_3CON(CH_3)$, R' and R'' are H, Y' is $CH_2C(CH_3)_2CH_2$], tan powder, m.p. 132°–134°C.

EXAMPLE 16 a. 3'-Carboxy-5'-(N-ethylacetamido)-2',4',6'-triiodoglutaranilic Acid [D; R is $CH_3CON(C_2H_5)$, R' and R'' are H, Y' is $CH_2CH_2CH_2$], colorless solid, m.p. 250°C.(dec.).

b. 2',4',6'-Triiodo-3'-(N-ethylacetamido)glutaranilic Acid [B; R is $CH_3CON(C_2H_5)$, R' and R'' are H, Y' is $CH_2CH_2CH_2$].

EXAMPLE 17 a. 3'-Carboxy-2',4',6'-triiodo-3-methyl-5'-(N-methylacetamido)succinanilic Acid [D; R is $CH_3CON(CH_3)$, R' and R'' are H, Y' is $CH(CH_3)CH_2$], light orange solid, m.p. 262°–264°C.(dec.).

b. 2',4',6'-Triiodo-3-methyl-3'-(N-methylacetamido)succinanilic Acid [B; R is $CH_3CON(CH_3)$, R' and R'' are H, Y' is $CH(CH_3)CH_2$].

EXAMPLE 18 a. 3'-Carboxy-2',4',6'-triiodo-5'-(N-methylacetamido)diglycolanilic Acid [D; R is $CH_3CON(CH_3)$, R' and R'' are H, Y' is $CH_2OCH_2$], disodium salt form, light tan solid, m.p. 245°–260°C.(dec.).

b. 2',4',6'-Triiodo-3'-(N-methylacetamido)-diglycolanilic Acid [B; R is $CH_3CON(CH_3)$, R' and R'' are H, Y' is $CH_2OCH_2$], colorless solid, m.p. 125°–133°c.

EXAMPLE 19 a. 3-[2-(Carboxymethylthio)acetamido]-2,4,6-triiodo-5-(N-methylacetamido)benzoic Acid [D; R is $CH_3CON(CH_3)$, R' and R'' are H, Y' is $CH_2SCH_2$], beige solid, m.p. 165°–170°C.

b. {N-[2,4,6-Triiodo-3-(N-methylacetamido)phenyl]-carbamoylmethylthio}acetic Acid [B; R is $CH_3CON(CH_3)$, R' and R'' are H, Y' is $CH_2SCH_2$].

EXAMPLE 20

{N-[2,4,6-Triiodo-3-(N-methylacetamido)phenyl]carbamoylmethylsulfonyl}acetic Acid [B; R is $CH_3CON(CH_3)$, R' and R'' are H, Y' is $CH_2SO_2CH_2$].

{N-[2,4,6-Triiodo-3-(N-methylacetamido)phenyl]-carbamoylmethylthio} acetic acid (derived by hydrolysis of 25.0 g. of 4-[2,4,6-triiodo-3-(N-methylacetamido)phenyl]-3,5-thiamorpholinedione) was dissolved in 150 ml. of glacial acetic acid at 40°C. Hydrogen peroxide (72 ml. 30%) was added. After five minutes the mixture was concentrated to a volume of 75 ml. and 400 ml. of water added. The product which separated was crystallized by stirring the mixture in ice, and was collected and dried to give {N-[2,4,6-triiodo-3-(N-methylacetamido)phenyl]-carbamoylmethylsulfonyl}acetic acid, m.p. 148°–150°C.(dec.).

EXAMPLE 21 a. 3-Succinimido-5-nitrobenzoic Acid [F; Y is $CH_2CH_2$] was prepared by heating 3-amino-5-nitrobenzoic acid with succinic anhydride in the presence of sulfuric acid. It had the m.p. 262°–268°C. when recrystallized from aqueous dimethylformamide.

b. 3'-Carboxy-5'-nitrosuccinanilic Acid [H; Y is $CH_2CH_2$] was prepared by treating 3-succinimido-5- nitrobenzoic acid with warm dilute aqueous sodium hydroxide, and had the m.p. 220°–221°C.

c. 3'-Carboxy-5'-aminosuccinanilic Acid [J; Y is $CH_2CH_2$].

3'-Carboxy-5'-nitrosuccinanilic acid (83.5 g.) and 50 ml. of concentrated ammonium hydroxide in 100 ml. of water were added to a heated solution of 540 g. of ferrous sulfate heptahydrate in 900 ml. of water. Concentrated ammonium hydroxide (100 ml.) was then added during fifteen minutes in 50 ml. portions. After thirty minutes of heating on a steam bath, the reaction mixture was filtered and made acid to pH 3.5. The product was collected and dried in vacuo over phosphorus pentoxide to give 57.5 g. of 3'-carboxy-5'-aminosuccinanilic acid, m.p. 194°C.(dec.).

d. 3'-Carboxy-5'-amino-2',4',6'-triiodosuccinanilic Acid [D; R is $NH_2$, R' and R" are H, Y' is $CH_2CH_2$].

Potassium iododichloride (335 ml. 2.23N in water), was added over a period of forty minutes to a stirred suspension of 57.3 g. of 3'-carboxy-5'-aminosuccinanilic acid in 435 ml. of water. The solid product was collected by filtration and recrystallized from water and from aqueous dimethylformamide. The product was purified by converting it to the diammonium salt and then to the disodium salt, m.p. 222°–225°C.(dec.). The latter was acidified to produce the free acid form of 3'-carboxy-5'-amino-2',4',6'-triiodosuccinanilic acid, cream colored solid, m.p. 156.2°–172.2°C.(dec.).

3'-Carboxy-5'-amino-2',4',6'-triiodosuccinanilic acid can be acylated with acetic anhydride, using a few drops of perchloric acid as a catalyst to obtain 3'-carboxy-5'-acetamido-2',4',6'-triiodosuccinanilic acid [D; R is $CH_3CONH$, R' and R" are H, Y' is $CH_2CH_2$], which can be decarboxylated according to the method of Example 1(b) to give 2',4',6'-triiodo-3'-acetamidosuccinanilic acid [B; R is $CH_3CONH$, R' and R" are H, Y' is $CH_2CH_2$].

EXAMPLE 22 a. 3-Glutarimido-5-nitrobenzoic Acid [F; Y is $CH_2Ch_2CH_2$] was prepared by heating a mixture of 18.2 g. of 3-amino-5-nitrobenzoic acid, 45.6 g. of glutaric anhydride and 0.5 ml. of concentrated sulfuric acid on a steam bath for two hours. The product was isolated and recrystallized from aqueous dimethylformamide to give 3-glutarimido-5-nitrobenzoic acid, pale yellow prisms, m.p. above 300°c.

b. 3-Glutarimido-5-aminobenzoic Acid [G; Y is $CH_2CH_2CH_2$] can be prepared by reduction of 3-glutarimido-5-nitrobenzoic acid. The reduction can be carried out catalytically (platinum or nickel catalyst) under neutral or acidic conditions.

c. 3-Glutarimido-5-amino-2,4,6-triiodobenzoic Acid [C; R is $H_2N$, Y is $CH_2CH_2CH_2$] can be prepared by iodination of 3-glutarimido-5-aminobenzoic acid with potassium iododichloride according to the procedure described in Example 21, part (d).

d. 3-Glutarimido-5-acetamido-2,4,6-triiodobenzoic Acid [C; R is $CH_3CONH$, Y is $CH_2CH_2CH_2$] can be prepared by acetylation of 3-glutarimido-5-amino-2,4,6-triiodobenzoic acid with acetic anhydride, using a few drops of perchloric acid as a catalyst.

e. 2',4',6'-Triiodo-3'-acetamidoglutaranilic Acid [B; R is $CH_3CONH$, R' and R" are H, Y' is $CH_2CH_2CH_2$] can be prepared by hydrolysis and decarboxylation of 3-glutarimido-5-acetamido-2,4,6-triiodobenzoic acid. Alternatively, 3-glutarimido-5-amino-2,4,6-triiodobenzoic can be converted by mild hydrolysis to 3'-amino-5'-carboxy-2',4',6'-triiodoglutaranilic acid, the latter decarboxylated to give 3'-amino-2',4',6'-triiodoglutaranilic acid, m.p. 225°–228°C., which is then acetylated to give 2',4',6'-triiodo-3'-acetamidoglutaranilic acid.

EXAMPLE 23 a. 3'-Carboxy-5'-amino-2',4',6'-triiodo-N-methylglutaranilic Acid [D; R is $H_2N$, R' is $CH_3$, R" is H, Y', is $CH_2CH_2CH_2$].

To a solution of 26.0 g. of 3'-carboxy-5'-amino-2',4',6'-triiodoglutaranilic acid [prepared by hydrolysis of 3-glutarimido-5-amino-2,4,6-triiodobenzoic acid (Example 22c)] in 100 ml. of 10% aqueous sodium hydroxide cooled in an ice bath was added 8 ml. of dimethyl sulfate in acetone. After three hours of stirring an additional 15 ml. of 10% sodium hydroxide and 2 ml. of dimethyl sulfate were added and the mixture stirred three hours longer. The reaction mixture was acidified, and the product collected and recrystallized from acetic acid to give 3'-carboxy-5'-amino-2',4',6'-triiodo-N-methylglutaranilic acid, pale gray crystals, m.p. 218°–220°C.(dec.).

3'-Carboxy-5'-glutarimido-2',4',6'-triiodo-N-methylglutaranilic Acid [C; R is $HOOC(CH_2)_3CON(CH_3)$, y is $CH_2Ch_2CH_2$] was prepared from 3'-carboxy-5'-amino-2',4',6'-triiodo-N-methylglutaranilic acid and glutaric anhydride according to the procedure of Example 1. The free acid was obtained as a colorless solid, m.p. 160°–161°C. when recrystallized from acetic acid, and the disodium salt form as a beige solid, m.p. 252°–255°C.

c. 3'-Glutarimido-2',4',6'-triiodo-N-methylglutaranilic Acid [A; R is $HOOC(CH_2)_3CON(CH_3)$, Y is $CH_2CH_2CH_2$] was prepared from 29.65 g. of the disodium salt of 3'-carboxy-5'-glutarimido-2',4',6'-triiodo-N-methylglutaranilic acid in 70 ml. of dimethylformamide, 30 minutes at reflux. The free acid product was obtained in the form of a mauve powder, m.p. 256°–257°C.; sodium salt form, mauve powder, m.p. 241°–245°C.

EXAMPLE 24 a. 3'-Carboxy-5'-(N-methylacetamido)-2',4',6'-triiodo-N-methylglutaranilic Acid [D; R is $CH_3CON(CH_3)$, R' is $CH_3$, R" is H, Y' is $CH_2CH_2Ch_2$] was prepared from 49.0 g. of 3'-carboxy-5'-(N-methylacetamido)-2',4',6'-triiodoglutaranilic acid (Example 10) and 15 ml. of dimethyl sulfate in 175 ml. of 10% sodium hydroxide according to the procedure of Example 23. The product was recrystallized from acetic acid, using ethyl acetate to bring the compound out of solution. There was thus obtained 3'-carboxy-5'-(N-methylacetamido)-2',4',6'-triiodo-N-methylglutaranilic acid, colorless prisms, m.p. 284°–287°C.(dec.).

b. 2',4',6'-Triiodo-3'-(N-methylacetamido)-N-methylglutaranilic Acid [B; R is $CH_3CON(CH_3)$, R' is $CH_3$, R" is H, Y' is $CH_2CH_2CH_2$] was prepared from 16.42 g. of the disodium salt of 3'-carboxy-5'-(N-methylacetamido)-2',4',6'-triiodo-N-methylglutaranilic acid in 40 ml. of dimethylformamide, 30 minutes at reflux. The free acid product was recrystallized from aqueous acetic acid and obtained as pale cream-colored crystals, m.p. 90°–100°C.; sodium salt form, m.p. 173°–175°C.

EXAMPLE 25 a. 3'-Carboxy-5'-(N-methylacetamido)-2',4',6'-triiodo-N-ethylglutaranilic Acid [D; R is $CH_3CON(CH_3)$, R' is $C_2H_5$, R'' is H, Y' is $CH_2CH_2CH_2$] was prepared from 56.3 g. of 3'-carboxy-5'-(N-methylacetamido)-2',4',6'-triiodoglutaranilic acid (Example 10) and 40 ml. of diethyl sulfate in 10% sodium hydroxide solution according to the procedure of Example 23. The product was recrystallized from acetic acid and from an aceteic acid-ethyl acetate mixture to give 3'-carboxy-5'-(N-methylacetamido)-2',4',6'-triiodo-N-ethylglutaranilic acid, m.p. 259°–261°C.(dec.).

b. 2',4',6'-Triiodo-3'-(N-methylacetamido)-N-ethylglutaranilic Acid [B; R is $CH_3CON(CH_3)$, R' is $C_2H_5$, R'' is H, Y' is $CH_2CH_2CH_2$] was prepared from 44.1 g. of the disodium salt of 3'-carboxy-5'-(N-methylacetamido)-2',4',6'-triiodo-N-ethylglutaranilic acid in 107 ml. of dimethylformamide, 45 minutes at reflux. The product had the m.p. 112°–112.5°C. when recrystallized from aqueous acetic acid.

3'Carboxy-5'-(N-methylacetamido)-2',4',6'-triiodoglutaranilic acid can similarly be alkylated with n-butyl iodide or 2-hydroxyethyl bromide to give 3'-carboxy-5'-(N-methylacetamido)-2',4',6'-triiodo-N-butylglutaranilic acid [D; R is $CH_3CON(CH_3)$, R' is $C_4H_9$, R'' is H, Y' is $CH_2CH_2Ch_2$], or 3'-carboxy-5'-(N-methylacetamido)-2',4',6'-triiodo-N-(2-hydroxyethyl)glutaranilic acid [D; R is $CH_3CON(CH_3)$, R' is $HOCH_2CH_2$, R'' is H, Y' is $CH_2CH_2Ch_2$]; which in turn can be decarboxylated to give, respectively, 2',4',6'-triiodo-3'-(N-methylacetamido)-N-butylglutaranilic acid [B; R is $CH_3CON(Ch_3)$, R' is $C_4CON(CH_9$, R'' is H, Y' is $CH_2CH_2CH_2$], or 2',4',6'-triiodo-3'-(N-methylacetamido)-N-(2-hydroxyethyl)glutaranilic acid [B; R is $CH_3CON(CH_3)$, R' is $HOCH_2CH_2$, R'' is H, Y' is $CH_2CH_2CH_2$].

EXAMPLE 26 a. 3'-Carboxy-2',4',6'-triiodo-5'-(N-methylacetamido)-3,3,N-trimethylglutaranilic Acid [D; R is $CH_3CON(CH_3)$, R' is $CH_3$, R'' is H, Y' is $CH_2C(CH_3)_2CH_2$], m.p. 183°–184.5°C., was prepared by methylation of 3'-carboxy-2',4',6'-triiodo-3,3-dimethyl-5'-(N-methylacetamido)glutaranilic acid (Example 15a) according to the method of Example 23(a).

b. 2',4',6'-Triiodo-3'-(N-methylacetamido)-3,3,N-trimethylglutaranilic Acid [B; R is $CH_3CON(CH_3)$, R' is $CH_3$, R'' is H, Y' is $CH_2C(CH_3)_2CH_2$], beige powder, m.p. 119°–122°C., was prepared by decarboxylation of 3'-carboxy-2',4',6'-triiodo-5'-(N-methylacetamido)-3,3,N-trimethylglutaranilic acid according to the method of Example 1(b).

The following compounds were prepared by the methylation procedure of Example 23(a):

EXAMPLE 27

N,N'-(2,4,6-Triiodo-m-phenylene)bis(N-methylglutaramic acid) [B; R is $HOOCCH_2CH_2CH_2CON(CH_3)$, R' is $CH_3$, R'' is H, Y' is $CH_2Ch_2CH_2$], disodium salt form, colorless prisms, m.p. 241°–245°C., by methylation of N,N'-(2,4,6-triiodo-m-phenylene)diglutaramic acid (Example 14b).

EXAMPLE 28

2',4',6'-Triiodo-3'-(N-methylacetamido)-N-methylsuccinanilic Acid [B; R is $CH_3CON(CH_3)$, R' is $CH_3$, R'' is H, Y' is $CH_2CH_2$], m.p. 199°–200°C. from aqueous acetic acid; sodium salt form, m.p. 170°–190°C. from -methanol-ether, by methylation of 2',4',6'-triiodo-3'-(N-methylacetamido)succinanilic acid (Example 11b).

EXAMPLE 29

2',4',6'-Triiodo-3'-(N-methylacetamido)-3,N-dimethylglutaranilic Acid [B; R is $CH_3CON(CH_3)$, R' is $CH_3$, R'' is H, Y' is $CH_2CH(CH_3)CH_2$], colorless powder, m.p. 101°–107.5°C., by methylation of 2',4',6'-triiodo-3'-(N-methylacetamido)-3-methylglutaranilic acid Example 13b).

EXAMPLE 30

{N-Methyl-N-[2,4,6-triiodo-3-(N-methylacetamido)-phenyl]carbamoylmethylthio} acetic Acid [B; R is $CH_3CON(CH_3)$, R' is $CH_3$, R'' is H, Y' is $CH_2SCH_2$], tan solid, m.p. 124°–129°C., prepared by hydrolysis of 4-[2,4,6-triiodo-3-(N-methylacetamido)phenyl]-3,5-thiamorpholinedione and methylation of the resulting N-[2,4,6-triiodo-3-(N-methylacetamido)phenyl]carbamoylmethylthio acetic acid.

EXAMPLE 31

2',4',6'-Triiodo-3'-(N-methylacetamido)-N-methyldiglycolanilic Acid [B; R is $CH_3CON(CH_3)$, R' is $CH_3$, R'' is H, Y' is $CH_2OCH_2$], colorless solid, m.p. 141°–143°C., prepared by hydrolysis of N-[2,4,6-triiodo-3-(N-methylacetamido)phenyl]-diglycolimide, and methylation of the resulting 2',4',6'-triiodo-3'-(N-methylacetamido)diglycolanilic acid.

EXAMPLE 32 a. N,N'-(2,4,6-Triiodo-α,m-toluylene)bis [acetamide] [K; R° is $CH_3CONHCH_2$, Q is $COCH_3$] was prepared by decarboxylation of 3-acetamido-5-acetamidomethyl-2,4,6-triiodobenzoic acid according to the method of Example 1(b), and was obtained in the form of a colorless solid, m.p. 287°–288°C. when recrystallized from acetic acid.

b. N-[2,4,6-Triiodo-3-(acetylaminomethyl)phenyl]-glutarimide [A; R is $CH_3CONHCH_2$, Y is $CH_2CH_2CH_2$] was prepared by interacting α-acetamido-2',4',6'-triiodo-m-acetotoluidide with glutaric anhydride according to the method of Example 2(a), and was obtained in the form of a colorless solid, m.p. 128°–134°C. when recrystallized from isopropyl alcohol.

EXAMPLE 33 a. N-[2,4,6-Triiodo-3-(acetylaminomethyl)-5-carboxyphenyl]-glutarimide [C; R is $CH_3CONHCH_2$, Y is $CH_2CH_2CH_2$] was prepared by interacting 3-acetamido-5-acetamidomethyl-2,4 6-triiodobenzoic acid with glutaric anhydride according to the method of Example 2(a), and was obtained in the form of a colorless solid, m.p. 256°–258°C. when recrystallized from acetic acid.

b. N-[2,4,6-Triiodo-3-(acetylaminomethyl)-5-carboxyphenyl]-glutaramic Acid [D; R is $CH_3CONHCH_2$, R' and R'' are H, Y' is $CH_2CH_2CH_2$] was prepared by hydrolysis of N-[2,4,6-triiodo-3-

(acetylaminomethyl)-5-carboxyphenyl]glutarimide with dilute sodium hydroxide, and was obtained in the form of a colorless solid, m.p. 234°–239°C. when recrystallized from acetic acid.

c. N-[2,4,6-Triiodo-3-(acetylaminomethyl)phenyl]-glutaramic Acid [B; R is $CH_3CONHCH_2$, R' and R" are H, Y' is $CH_2CH_2CH_2$] was prepared by decarboxylation of N-[2,4,6-triiodo-3-(acetylaminomethyl)-5-carboxyphenyl]glutaramic acid according to the method of Example 1(b), and was obtained in the form of the colorless solid, m.p. 254°–259°C. when recrystallized from aqueous dimethylformamide. The same substance can be prepared by hydrolysis of N-[2,4,6-triiodo-3-(acetylaminomethyl)phenyl]-glutarimide (Example 32b) with warm dilute sodium hydroxide.

Example 34

N-[2,4,6-Triiodo-3-(acetylaminomethyl)phenyl]-N-methylglutaramic Acid [B;; R is $CH_3CONHCH_2$, R' is $CH_3$, R" is H, Y' is $CH_2CH_2CH_2$] was prepared by interacting N-[2,4,6-triiodo-3-(acetylaminomethyl)-phenyl]glutaramic acid (Example 33c) with dimethyl sulfate according to the procedure of Example 23, and was obtained in the form of a colorless solid, m.p. 167°–175°C. when recrystallized from ethyl acetate.

EXAMPLE 35 a. Methyl 3'-carboxy-2',4',6'-triiodo-5'-(N-methylacetamido)-azelanilate [D; R is $CH_3CON(CH_3)$, R' is H, R" is $CH_3$, Y' is $—(CH_2)_7—$].

A mixture of 100 g. of azelaic acid monomethyl ester and 500 ml. of thionyl chloride was refluxed for one hour. The excess thionyl chloride was removed by distillation and the last traces removed by adding benzene and evaporating the solvent. A solution of 260 g. of 3-amino-5-acetamido-2,4,6-triiodobenzoic acid in 3500 ml. of dioxane was then added to the resulting acid chloride of azelaic acid monomethyl ester, and the mixture was refluxed for six hours. The dioxane was then removed by distillation and the residual product recrystallized from acetic acid to give methyl 3'-carboxy-2',4',6'-triiodo-5'-(N-methylacetamido)azelanilate, as colorless needles, m.p. 198°–203°C.

By replacing the azelaic acid monomethyl ester by a molar equivalent amount of oxalic acid monomethyl ester or malonic acid monomethyl ester, there can be obtained, respectively, methyl 3'-carboxy-2',4',6'-triiodo-5'-(N-methylacetamido)-oxalanilate [D; R is $CH_3CON(CH_3)$, R' is H, R" is $CH_3$, Y' is single bond], or methyl 3'-carboxy-2',4',6'-triiodo-5'-(N-methylacetamido)malonanilate [D; R is $CH_3CON(CH_3)$, R' is H, R" is $CH_3$, Y' is $—CH_2—$].

b. 3'-Carboxy-2',4',6'-triiodo-5'-(N-methylacetamido)azelanilic Acid [D; R is $CH_3CON(CH_3)$, R' and R" are H, Y' is $—(CH_2)_7—$].

A mixture of 136.5 g. of methyl 3'-carboxy-2',4',6'-triiodo-5'-(N-methylacetamido)azelanilate and 180 ml. of water was treated with 10% aqueous sodium hydroxide (about 140 ml.), added dropwise until solution was complete. The mixture was heated on a steam bath for ten minutes, 18 ml. more of 10% sodium hydroxide was added, and the mixture heated one hour longer. The reaction mixture was cooled, acidified with 3% hydrochloric acid, and the solid product collected, washed with water, dried and recrystallized from acetic acid to give 3'-2',4',6'-triiodo-5'-(N-methylacetamido)azelanilic acid as a colorless solid, m.p. 205°–208°C.

By replacing the methyl 3'-carboxy-2',4',6'-triiodo-5'-(N-methylacetamido)azelanilate by a molar equivalent amount of methyl 3'-carboxy-2',4',6'-triiodo-5'-(N-methylacetamido)oxalanilate or methyl 3'-carboxy-2',4',6'-triiodo-5'-(N-methylacetamido)malonanilate there can be obtained, respectively, 3'-carboxy-2',4',6'-triiodo-5'-(N-methylacetamido)oxalanilic acid [D; R is $CH_3CON(CH_3)$, R' and R" are H, Y' is single bond] or 3'-carboxy-2',4',6'-triiodo-5'-(N-methylacetamido)malonanilic acid [D; R is $CH_3CON(CH_3)$, R' and R" are H, Y' is $—CH_2—$].

c. 2',4',6'-Triiodo-3'-N(-methylacetamido)azelanilic Acid [B; R is $CH_3CON(CH_3)$, R' and R" are H, Y' is $—(CH_2)_7—$] was prepared by decarboxylation of 3'-carboxy-2',4',6'-triiodo-5'-(N-methylacetamido)azelanilic acid according to the method of Example 1(b), and was obtained in the form of a colorless solid, m.p. 153°–160°C.

By replacing the 3'-carboxy-2',4',6'-triiodo-5'-(N-methylacetamido)azelanilic acid by a molar equivalent amount of 3'-carboxy-2',4',6'-triiodo-5'-(N-methylacetamido(oxalanilic acid and 3'-carboxy-2',4',6'-triiodo-5'-(N-methylacetamido)malonanilic acid there can be obtained, respectively, 2',4',6'-triiodo-3'-(N-methylacetamido)oxalanilic acid [B; R is $CH_3CONH(CH_3)$, R' and R" are H, Y' is single bond] or 2',4',6'-triiodo-3'-(N-methylacetamido)malonanilic acid [B; R is $CH_3CONH(CH_3)$, R' and R" are H, Y' is $—CH_2—$].

Alternatively, 2',4',6'-triiodo-3'-(N-methylacetamido)-azelanilic acid can be prepared by interacting 3-amino-2,4,6-triiodo-N-methylacetanilide [K; R° is $CH_3CON(CH_3)$, Q is H] with the acid chloride or azelaic acid monomethyl ester, and subjecting to mild alkaline hydrolysis the resulting methyl 2',4',6'-triiodo-5'-(N-methylacetamido)azelanilate [B; R is $CH_3CON(CH_3)$, R' is H, R" is $CH_3$, Y' is $—(CH_2)_7—$].

d. 2',4',6'-Triiodo-N-methyl-3'-(N-methylacetamido)azelanilic Acid [B; R is $CH_3CON(CH_3)$, R' is $CH_3$, R" is H, Y is $—(CH_2)_7—$] was prepared by methylation of 2',4',6'-triiodo-3'-(N-methylacetamido)azelanilic acid with dimethyl sulfate according to the procedure of Example 23, and was obtained in the form of its sodium salt, colorless solid, m.p. above 125°C.

EXAMPLE 36 a. N-Methyl-N,N'-(2,4,6-triiodo-m-phenylene)bis[acetamide] [K; R° is $CH_3CON(CH_3)$, Q is $COCH_3$] was prepared by decarboxylation of 3-acetamido-5-(N-methylacetamido)-2,4,6-triiodobenzoic acid according to the procedure of Example 1(b), and was obtained in the form of a colorless solid, m.p. 160°C.

b. 3-Maleimido-2,4,6-triiodo-N-methylacetanilide [A; R is $CH_3CON(CH_3)$, Y is $—CH=CH—$] can be prepared by interacting 2,4,6-triiodo-N-methyl-m-benzenediacetamide with maleic anhydride according to the procedure of Example 2(a), or by decarboxylation of 2,4,6-triiodo-3-maleimido-5-(N-methylacetamido)benzoic acid, m.p. 312°C.(dec.).

c. 5'-(N-Methylacetamido)-2',4',6'-triiodomaleanilic Acid [B; R is $CH_3CON(CH_3)$, R' and R" are H, Y' is $—CH=CH—$] can be prepared by hydrolysis of 3-maleimido-2,4,6-triiodo-N-methylacetanilide with dilute sodium hydroxide.

I claim:
1. A compound of the formula

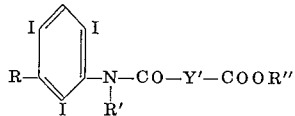

wherein Y' is an alkylene bridge having from one to eight carbon atoms interrupted by from one to three members selected from O, S, SO and SO$_2$, said members, when more than one, being separated by at least two carbon atoms; R is (lower-alkanoyl)NH, (lower-alkanoyl)NHCH$_2$, (lower-alkanoyl)N(lower-alkyl), (lower-alkoxy-lower-alkanoyl)NH, (lower-alkoxy-lower-alkanoyl)N(lower-alkyl), HOOC—Y'—CO—NH, or HOOC—Y'—CO—N(lower-alkyl): R' is hydrogen, lower-alkyl, or hydroxy-lower-alkyl; and R'' is hydrogen or lower-alkyl.

2. A compound according to claim 1 wherein R is (lower-alkanoyl)N(lower-alkyl) and R'' is hydrogen.

3. {N-Methyl-N-[2,4,6-triiodo-3-(N-methylacetamido)-phenyl]carbamoylmethylthio}acetic acid, according to claim 2.

4. {N-[2,4,6-Triiodo-3-(N-methylacetamido)phenyl]-carbamoylmethylsulfonyl}acetic acid, according to claim 2.

5. 2',4',6'-Triiodo-3'-(N-methylacetamido)diglycolanilic acid, according to claim 2.

6. 2',4',6'-Triiodo-3'-(N-methylacetamido)-N-methyldiglycolanilic acid, according to claim 2.

* * * * *